H. HUNT.
SHARPENER.
APPLICATION FILED AUG. 12, 1919.
1,329,971.
Patented Feb. 3, 1920.
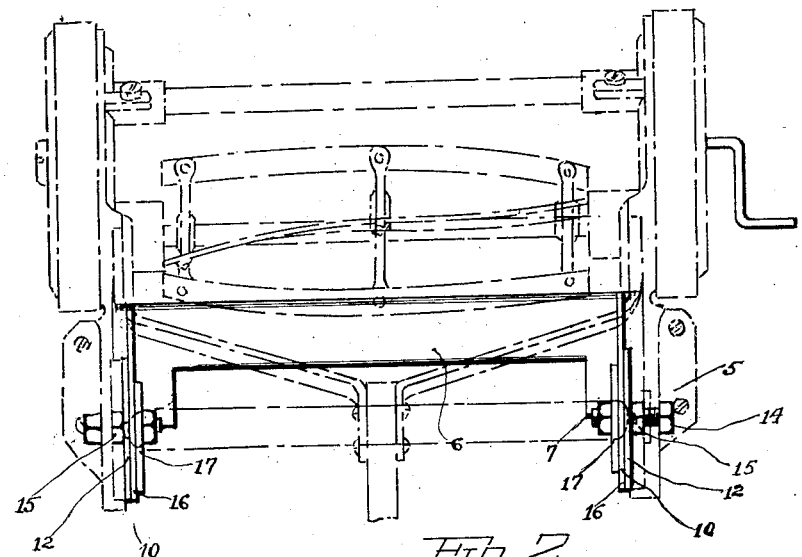
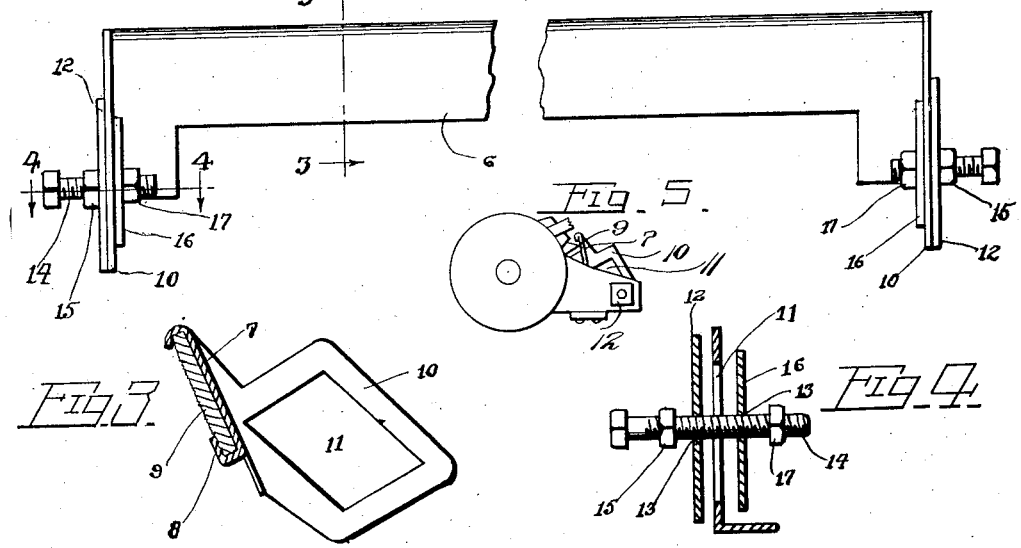
Inventor
Henry Hunt

UNITED STATES PATENT OFFICE.

HENRY HUNT, OF KOKOMO, INDIANA.

SHARPENER.

1,329,971. Specification of Letters Patent. Patented Feb. 3, 1920.

Application filed August 12, 1919. Serial No. 317,047.

*To all whom it may concern:*

Be it known that I, HENRY HUNT, a citizen of the United States, residing at Kokomo, in the county of Howard and State of Indiana, have invented a new and useful Sharpener, of which the following is a specification.

This invention relates to lawn mower sharpening devices, and more particularly to an adjustable sharpening device so constructed that the same may be readily secured to and removed from the frame of a lawn mower.

A further object of the invention is to provide a device of this character wherein the sharpening element is supported rigidly, and within the direct path of travel of the blades being sharpened, during the sharpening operation, thereby insuring straight cutting edges being formed on the rotary knives.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

Referring now to the drawing:—

Figure 1 illustrates a lawn mower, in dotted lines, with my invention applied thereto.

Fig. 2 illustrates a bottom plan view of the sharpening element,

Fig. 3 illustrates a sectional view taken on line 3—3 of Fig. 2.

Fig. 4 illustrates a sectional view taken on line 4—4 of Fig. 2.

Fig. 5 illustrates a side elevational view showing the invention as applied.

Referring to the drawings in detail, the reference character 5 designates the usual rearwardly extending brackets of a lawn mower frame, said brackets ordinarily being for the purpose of supporting the roller employed in connection with lawn mower constructions, and which as shown, support the sharpening device forming the subject matter of the present invention.

With reference to Fig. 1 of the drawing, the roller of the lawn mower is shown in dotted lines and the device forming the present invention being secured to the brackets 5 whereby the same is supported to have a sharpening effect on the blades.

The sharpening device includes a metallic frame, or file support, and comprises an elongated metallic base plate 6 having its lower or front edge bent upwardly at an angle to form the flange 7, which as shown extends the entire length of the base plate 6, and provides one of the file supporting members.

Coöperating with the angular flange 7, is a flange member 8, which is also integral with the base plate 6, and extends inwardly over the base plate, in spaced relation therewith, in a plane substantially parallel with the base plate. A file member 9, used as the sharpening element of the invention, and which contacts with the rotary blades when the same are undergoing a sharpening operation, is slid onto the base plate 6, under the angular flange 7 and flange member 8, in a position to permit the surface thereof to extend below the flange 7 and flange member 8, to enable the same to contact with the rotary blades.

Formed integrally on the base plate 6, and disposed at opposite ends thereof, are the rearwardly extending arms 10, each of which is provided with a substantially large opening 11, to provide means for adjustably securing the sharpening device to the lawn mower to be sharpened.

A relative large clamping plate 12 is used in connection with each of the arms 10, said clamping plates being of a size to close the opening formed in the arms 10, and coöperate with the arms 10 for providing a clamping means whereby the sharpener is rigidly clamped on the lawn mower frame.

As shown by the drawings, the clamping plates 12 are provided with central threaded openings 13, and it will be seen that each of the openings accommodates a threaded bolt 14, the bolt having a nut 15 supported thereon to engage the clamping plate 12 for forcing the same into engagement with the side walls of the bracket to which the sharpening device is secured. Operating on the bolt 14, and adapted to engage the opposite side of the bracket to which the sharpener is secured, is a plate 16, which is also forced into engagement with the bracket by means of the nut 17 operating on the threaded portion of the bolt 14.

The operation of the device is as follows:—

If it becomes necessary to sharpen the blades of a lawn mower, the sharpening device is attached to the lawn mower, by means of the threaded bolt 14, at a point adjacent the roller supporting brackets, as shown by Fig. 1 of the drawing.

The wheels which support the lawn mower are removed and the crank handle shown by Fig. 1 of the drawing is positioned on the crank shaft of the lawn mower, and rotated in an anti-clock-wise direction, with the result that the cutting blades mounted thereon revolve over the file 9, with the result that the same are sharpened.

Having thus described the invention, what is claimed is:—

1. In an attachment for sharpening lawn mowers, a file supporting member including a base plate, flanges forming a part of the base plate, said flanges extending throughout the length of the base plate, to provide a file supporting means, right angled arms formed integral with the base plate, each of said arms having relatively large openings formed therein, clamping plates provided on the opposite sides of the arms, and means extending through the relatively large openings and having connection with the clamping plates for securing the base plate to a lawn mower.

2. In an attachment for sharpening lawn mowers, a base plate including parallel flanges, said parallel flanges adapted to embrace the side edges of a file, for supporting the same on the base plate, an arm formed integral with each end of the base plate, clamping plates coöperating with the arm, said clamping plates adapted to embrace the frame of a lawn mower for securing the same thereto, and means extending through the clamping plates for securing the clamping plates to the integral arms.

In testimony that I claim the foregoing as my own, I have hereto affixed my signature in the presence of two witnesses.

HENRY HUNT.

Witnesses:
J. O. DRINKWATER,
LOUIS BECKER.